United States Patent
Chang et al.

(10) Patent No.: US 10,650,508 B2
(45) Date of Patent: *May 12, 2020

(54) AUTOMATIC DEFECT CLASSIFICATION WITHOUT SAMPLING AND FEATURE SELECTION

(71) Applicant: KLA-TENCOR CORPORATION, Milpitas, CA (US)

(72) Inventors: Wei Chang, Foster City, CA (US); Ramon Olavarria, Fremont, CA (US); Krishna Rao, San Ramon, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 504 days.

This patent is subject to a terminal disclaimer.

(21) Appl. No.: 14/956,326

(22) Filed: Dec. 1, 2015

(65) Prior Publication Data
US 2016/0163035 A1 Jun. 9, 2016

Related U.S. Application Data

(60) Provisional application No. 62/174,288, filed on Jun. 11, 2015, provisional application No. 62/087,180, filed on Dec. 3, 2014.

(51) Int. Cl.
*G06K 9/46* (2006.01)
*G06K 9/62* (2006.01)
(Continued)

(52) U.S. Cl.
CPC .......... *G06T 7/0004* (2013.01); *G06K 9/4628* (2013.01); *G06K 9/6255* (2013.01);
(Continued)

(58) Field of Classification Search
CPC . G06T 2207/30148; G06T 2207/20076; G06T 2207/20081; G06T 7/0004;
(Continued)

(56) References Cited

U.S. PATENT DOCUMENTS

| | | |
|---|---|---|
| 6,092,059 A | 7/2000 | Straforini et al. |
| 6,148,099 A | 11/2000 | Lee et al. |

(Continued)

FOREIGN PATENT DOCUMENTS

| | | |
|---|---|---|
| CN | 1823350 A | 8/2006 |
| JP | H0821803 A | 1/1996 |
| JP | 2008536211 A | 9/2008 |

OTHER PUBLICATIONS

LeCun, Yann, et al. "Gradient-based learning applied to document recognition." Proceedings of the IEEE 86.11 (1998): 2278-2324.*

(Continued)

*Primary Examiner* — Vincent Rudolph
*Assistant Examiner* — Raphael Schwartz
(74) *Attorney, Agent, or Firm* — Hodgson Russ LLP

(57) ABSTRACT

Systems and methods for defection classification in a semiconductor process are provided. The system includes a communication line configured to receive a defect image of a wafer from the semiconductor process and a deep-architecture neural network in electronic communication with the communication line. The neural network has a first convolution layer of neurons configured to convolve pixels from the defect image with a filter to generate a first feature map. The neural network also includes a first subsampling layer configured to reduce the size and variation of the first feature map. A classifier is provided for determining a defect classification based on the feature map. The system may include more than one convolution layers and/or subsampling layers. A method includes extracting one or more features from a defect image using a deep-architecture neural network, for example a convolutional neural network.

20 Claims, 9 Drawing Sheets

(51) Int. Cl.
    *G06K 9/66*     (2006.01)
    *G06T 7/00*     (2017.01)

(52) U.S. Cl.
    CPC .............. *G06K 9/6274* (2013.01); *G06K 9/66* (2013.01); *G06K 2209/19* (2013.01); *G06T 2207/20081* (2013.01); *G06T 2207/20084* (2013.01); *G06T 2207/30148* (2013.01)

(58) Field of Classification Search
    CPC ....... G01N 21/9501; G01N 2021/8854; G01N 2021/8887; G01N 2223/6116; G01N 2223/646
    See application file for complete search history.

(56) References Cited

U.S. PATENT DOCUMENTS

| | | | |
|---|---|---|---|
| 6,744,266 | B2 | 6/2004 | Amos et al. |
| 6,988,045 | B2 | 1/2006 | Purdy |
| 7,283,659 | B1 | 10/2007 | Bakker et al. |
| 7,761,182 | B2 | 7/2010 | Gallarda et al. |
| 8,315,453 | B2 | 11/2012 | Shlain et al. |
| 8,379,965 | B2 | 2/2013 | Iwanaga |
| 8,660,340 | B2 | 2/2014 | Shibuya et al. |
| 9,465,985 | B2 * | 10/2016 | Xia ........................ G06F 17/276 |
| 2002/0051567 | A1 | 5/2002 | Ganz et al. |
| 2002/0155628 | A1 | 10/2002 | Bulaga et al. |
| 2003/0208731 | A1 | 11/2003 | Miwa |
| 2003/0228049 | A1 | 12/2003 | Asai |
| 2004/0034612 | A1 | 2/2004 | Mathewson et al. |
| 2006/0133661 | A1 * | 6/2006 | Takeda ............. G01N 21/95607 382/149 |
| 2008/0147355 | A1 | 6/2008 | Fields et al. |
| 2008/0201282 | A1 | 8/2008 | Garcia et al. |
| 2008/0281548 | A1 | 11/2008 | Algranati et al. |
| 2011/0228976 | A1 * | 9/2011 | Fitzgibbon ......... G06K 9/00335 382/103 |
| 2013/0108146 | A1 * | 5/2013 | Li ........................... H01L 22/12 382/144 |
| 2013/0170733 | A1 | 7/2013 | Leu |
| 2013/0279795 | A1 | 10/2013 | Shlain et al. |
| 2013/0294680 | A1 * | 11/2013 | Harada .................. H01L 22/20 382/149 |
| 2014/0133737 | A1 | 5/2014 | Plihal et al. |

OTHER PUBLICATIONS

Sharma, Riti. Object Detection using Dimensionality Reduction on Image Descriptors. Rochester Institute of Technology, Jun. 2014.*

Nair, Vinod, and Geoffrey E. Hinton. "3D object recognition with deep belief nets." Advances in neural information processing systems. 2009.*

Dalal & Triggs, "Histograms of Oriented Gradients for Human Detection," IEEE Computer Society Conference on Computer Vision and Pattern Recognition, 2005, San Diego, USA.

Ojala, Pietikainen, & Maenpaa, "Multiresolution Gray-Scale and Rotation Invariant Texture Classification with Local Binary Patterns," Pattern Analysis and Machine Intelligence, IEEE Transactions on 24.7, 2002, pp. 971-987.

Lecun, Bottou, Bengio, & Haffner, "Gradient-Based Learning Applied to Document Recognition," Proceedings of the IEEE, Nov. 1998, pp. 2278-2324, vol. 86, No. 11.

Tola, Lepetit, & Fua, "Daisy: An Efficient Dense Descriptor Applied to Wide-Baseline Stereo," Pattern Analysis and Machine Intelligence, IEEE Transactions, Apr. 2009, pp. 815-830, vol. 32, issue 5.

Bengio, "Learning Deep Architectures for AI," Foundations and Trends in Machine Learning, 2009, pp. 1-71, vol. 2, No. 1.

Glazer & Sipper, "Evolving an Automatic Defect Classification Tool," Applications of Evolutionary Computing, 2008, pp. 194-203, vol. 4974.

Hunt, Karnowski, Kiest, & Villalobos, "Optimizing Automatic Defect Classification Feature and Classifier Performance for Post-Fab Yield Analysis," Advanced Semiconductor Manufacturing Conference and Workshop, 2000, Abstract.

El Doker & Scott, "A Novel Clustering and Declustering Algorithm for Fuzzy Classification of Wafer Defects," University/Government/Industry Microelectronics Symposium, 2003, Abstract.

* cited by examiner

AUTOMATIC DEFECT CLASSIFICATION WITHOUT SAMPLING AND FEATURE SELECTION

CROSS-REFERENCE TO RELATED APPLICATIONS

This application claims priority to the provisional patent application filed Dec. 3, 2014 and assigned U.S. App. No. 62/087,180 and to the provisional patent application filed Jun. 11, 2015 and assigned U.S. App. No. 62/174,288, the disclosures of which are hereby incorporated by reference.

FIELD OF THE DISCLOSURE

The disclosure relates to systems and methods for automatic defect classification in semiconductor manufacturing tools.

BACKGROUND OF THE DISCLOSURE

In manufacturing semiconductor devices, a defect review system is used to classify defects within a semiconductor process and can help in narrowing down the root cause of a defect or an excursion of the process. The defect review system does this by acquiring high resolution images around defect areas at a sub-micron level. Based on the acquired images, the system or an operator can classify the defects into categories in accordance with the type of the defects and how the defects may affect the production yield. If done using the system, this is an automated process. The current state of the art in automatic defect classification still requires operator intervention since typical automated techniques still leave a significant portion of defects unclassified.

Feature vectors that represent the defect review images are important to the accuracy of defect classification. Yet discriminating features are hard to discover and have are often maintained as secrets in many commercial defect review and classification systems. Features may be organized in a hierarchical manner. For example, a common lower-level feature is an edge detector, while a set of edge patterns in a neighboring area form middle-level cues such as parallel lines, corners, line junctions, etc. It is well known that most image processing techniques focus on extracting low-level features, and that designing features for high-level object representation is very difficult. In addition, features that can be used to classify one set of defect images may not work at all for other data sets. Thus, a new approach for discovering features that can represent mid-to-high level objects is needed.

In current defect classification practice, an operator sample a few defect images from each category, and spends significant time searching for features to separate unclassified defect images into corresponding categories. The process may be repeated for every layer of each new device in the semiconductor manufacturing process, which increases the time to ramp up a fab. Further, the classification results vary from one operator to another because an operator can choose different discriminating features based on his experience and understanding of the device. Such inconsistent classification causes unnecessary confusion or even contradiction in the process control of wafer manufacturing. It will be advantageous for operators if a system or method can automatically search useful features.

Many approaches have been implemented to automatically classify defect images. Most of the existing approaches involve two steps. First, features that characterize defect images are extracted and then classifiers are built based on the numerical values of features to assign a class code to each defect. The extracted features should have distinguishing power to separate one type of defect from another. For example, U.S. Pat. App. Pub. No. 2013/0279795 disclosed a method to use kernel function to transfer the region of a defect area to a real valued feature that can characterize the shape of the region. The classification approach based on the extracted features is usually a simple binary branched decision tree (such as the decision tree described in U.S. Pat. No. 8,660,340.

One well-known issue with the above mentioned approaches is the contribution of classifier. Typical current classifiers can classify 60%-70% of output defects from a device. However, the throughput of defect review systems in production environments makes it impossible for operators to manually classify the remaining images. For example, a known defect review system can output as many as ~18,000-20,000 defects per hour. With a 60%-70% automated classification rate, it still leaves ~6,000-8,000 defects per hour that need to be manually classified by an operator.

Systems have been developed that can improve on the contribution of the classifier by using complex machine learning approaches such as a Support Vector Machine (as described in U.S. Pat. No. 8,315,453). However, these systems require a training phase in production and an expert defined feature set, which can impact the production ramp as well as require highly trained operator to identify the feature set.

BRIEF SUMMARY OF THE DISCLOSURE

In an embodiment of the present disclosure, a system for defection classification in a semiconductor process is provided. The system includes a communication line configured to receive a defect image of a wafer from the semiconductor process. The communication line may be, for example, a wired network connection, wireless network connection, serial line, USB connection, or any other communication line. The image may be received from a remote device or a local device. For example, the image may be received from storage device, an inspection device in a semiconductor process, a camera, etc. The system includes a deep architecture neural network in electronic communication with the communication line. The neural network has a first convolution layer of neurons. Each neuron of the first convolution layer is configured to convolve a corresponding receptive field of pixels from the defect image with a filter to generate a first feature map. The neural network also includes a first subsampling layer configured to reduce the size and variation of the first feature map. A classifier is provided for determining a defect classification based on the feature map. The system may include more than one convolution layers and/or subsampling layers.

In another embodiment, a method for defect classification in a semiconductor process is provided. The method includes extracting one or more features from a defect image of a wafer from the semiconductor process using a deep-architecture neural network. Using the neural network, the defect image is classified based on the extracted one or more features. The one or more features may be extracted from the defect image using a convolutional neural network (CNN) having one or more convolutional layers, each convolutional layer of the one or more convolutional layers followed by a subsampling layer.

In another embodiment, a system for deriving features is provided. The system includes an electronic storage device and a feature library stored on the storage device. The system also includes a deep-architecture neural network which is in electronic communication with the storage device. The neural network is configured to derive a feature from one or more defect image, where the feature is statistically significant for classifying a defect of the defect images. The neural network is further configured to encapsulate the feature with a set of calculations used to determine the feature and add the encapsulated feature to the feature library of the storage device.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

The systems and methods of the present disclosure describe a new approach that eliminates the training/setup phase in automated defect classification (ADC) system. Although the new approach may require a large amount of defect images and time to build a machine-learning defect classification system, once the learning has been achieved and the library is in place, it can be leveraged to offset the impact incurred during set up. Often, many images are collected during the acceptance process before a tool is shipped to a customer. Such images can be utilized for the learning process. Once deployed, the new ADC approach can immediately generate defect class codes without any human intervention. The productivity impact is significant.

For example, using the presently disclosed system and method, there is no need for sampling and verification from operators, thereby saving manpower. No classifier setup process is required and ramp time improves. Inconsistencies and variations caused by operators are eliminated. And, faster identification of process defect issues leads to higher overall yields.

The presently disclosed systems and methods may also improve throughput by at least two times because the new approach requires only a defect image rather than a defect image and a reference image as in the current practice. In addition, the disclosed systems and methods can automatically discover features not recognized by a human image processing expert. The new features may help improve the classification accuracy significantly. Such features can be reexamined by a domain expert to gain more insight on the defect images and potentially the root cause of the defect.

Figure 8:
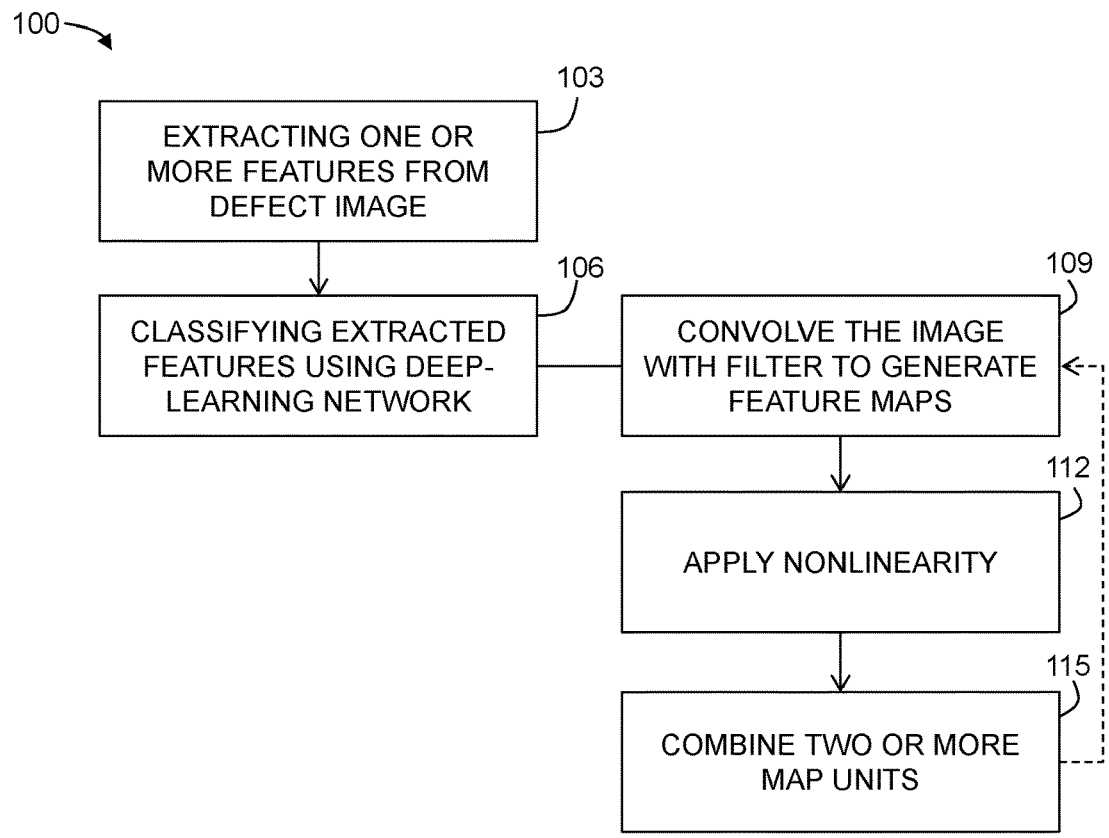
FIG. 8 depicts a method according to an embodiment of the present disclosure.

The present disclosure may be embodied as a method 100 for defect classification in a semiconductor process using "deep learning" (see, e.g., FIG. 8)—i.e., using a deep-architecture neural network. Rooted in neural network technology, "deep learning" is a probabilistic graph model with a lot of neuron layers, commonly known as a deep architecture. "Deep learning" technology processes the information such as image, text, voice and so on in a hierarchical manner. In using deep learning in the present disclosure, feature extraction is accomplished automatically using learning from data. This is advantageous over previous approaches which extract features based on experts' understanding of a set of images. The method 100 comprises extracting 103 one or more features from a defect image of a wafer from the semiconductor process. The defect image may be an image of the entire wafer or a portion of a wafer—e.g., a portion of a wafer wherein a defect is suspected or has been found. The defect image comprises a plurality of pixel, and the present method 100 is suitable for use at the level of pixel values. The defect is classified 106 using the deep-architecture neural network based on the one or more extracted features.

There are many variants of neural networks with deep architecture depending on the probability specification and network architecture, including, but not limited to, Deep Belief Networks (DBN), Restricted Boltzmann Machines (RBM), and Auto-Encoders. Another type of deep neural network, a convolutional neural network (CNN), works is suitable for image classification. Although other deep learning neural networks can be used, an exemplary embodiment of the present disclosure is described using a LeNet-5 architecture to illustrate the concepts of a convolutional neural network. The actual implementation may vary depending on the size of images, the number of images available, and the nature of the problem. For example, for optical defect images of size 32*32, a low-capacity neural network model having two convolution layers (e.g., LeNet) may be appropriate, while for scanning electron microscope (SEM) images of size 480*480 pixels, a higher-capacity model having, for example, seven convolution layers (e.g., AlexNet) may be better suited.

Figure 4:
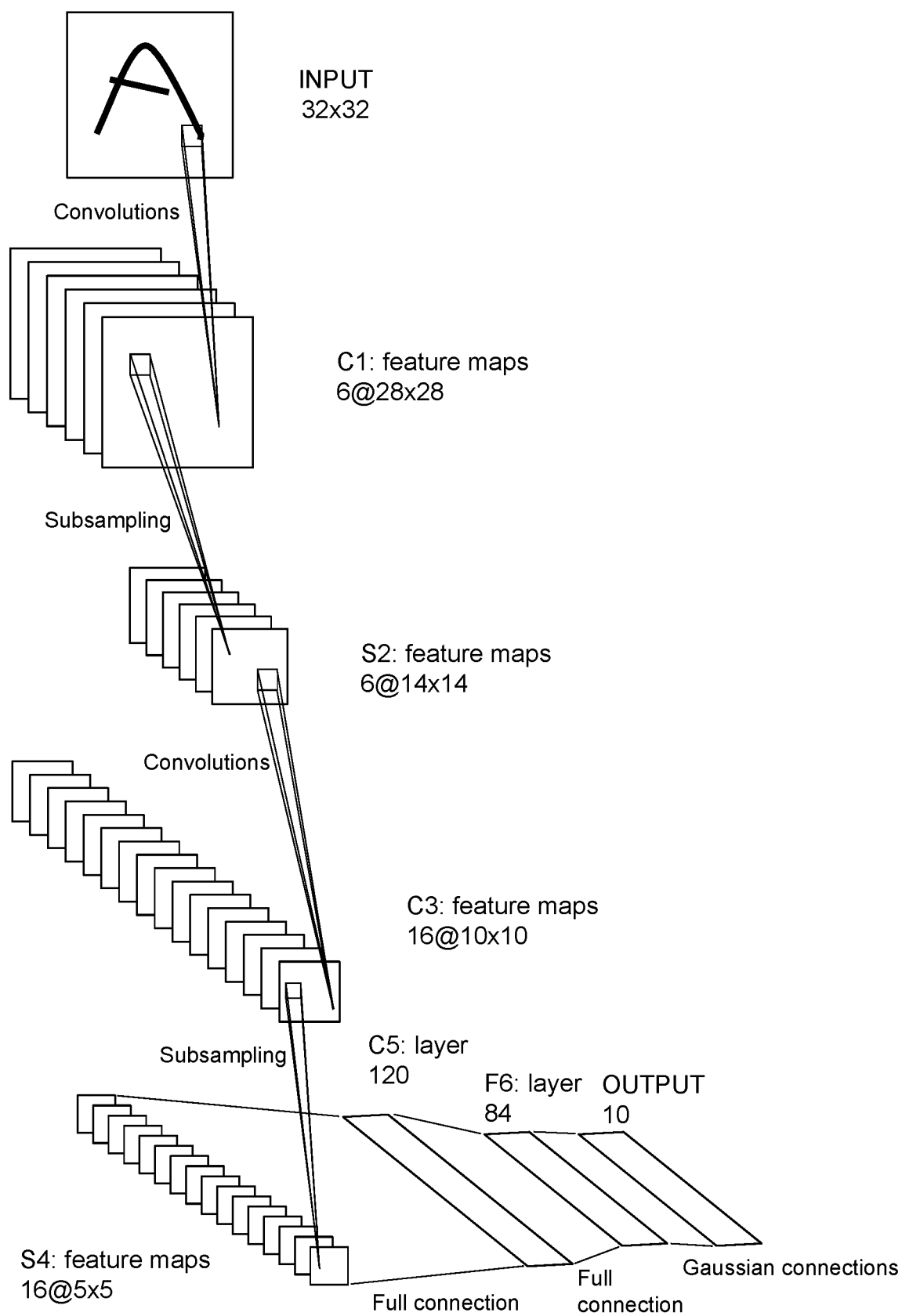
FIG. 4 is a diagram illustrating a convolutional neural network that can be used in accordance with the present disclosure.

In an exemplary embodiment, the features are extracted 103 from the defect image using a CNN. The CNN has one or more convolutional layers, and each convolutional layer is usually followed by a subsampling layer. Convolutional networks are inspired by visual systems structure. The visual cortex contains a complex arrangement of cells. These cells are sensitive to small sub-regions of the visual field, called a receptive field. As shown in FIG. 4, a small region in the input is processed by a neuron in the next layer. Those small regions are tiled up to cover the entire input images.

Figure 1:
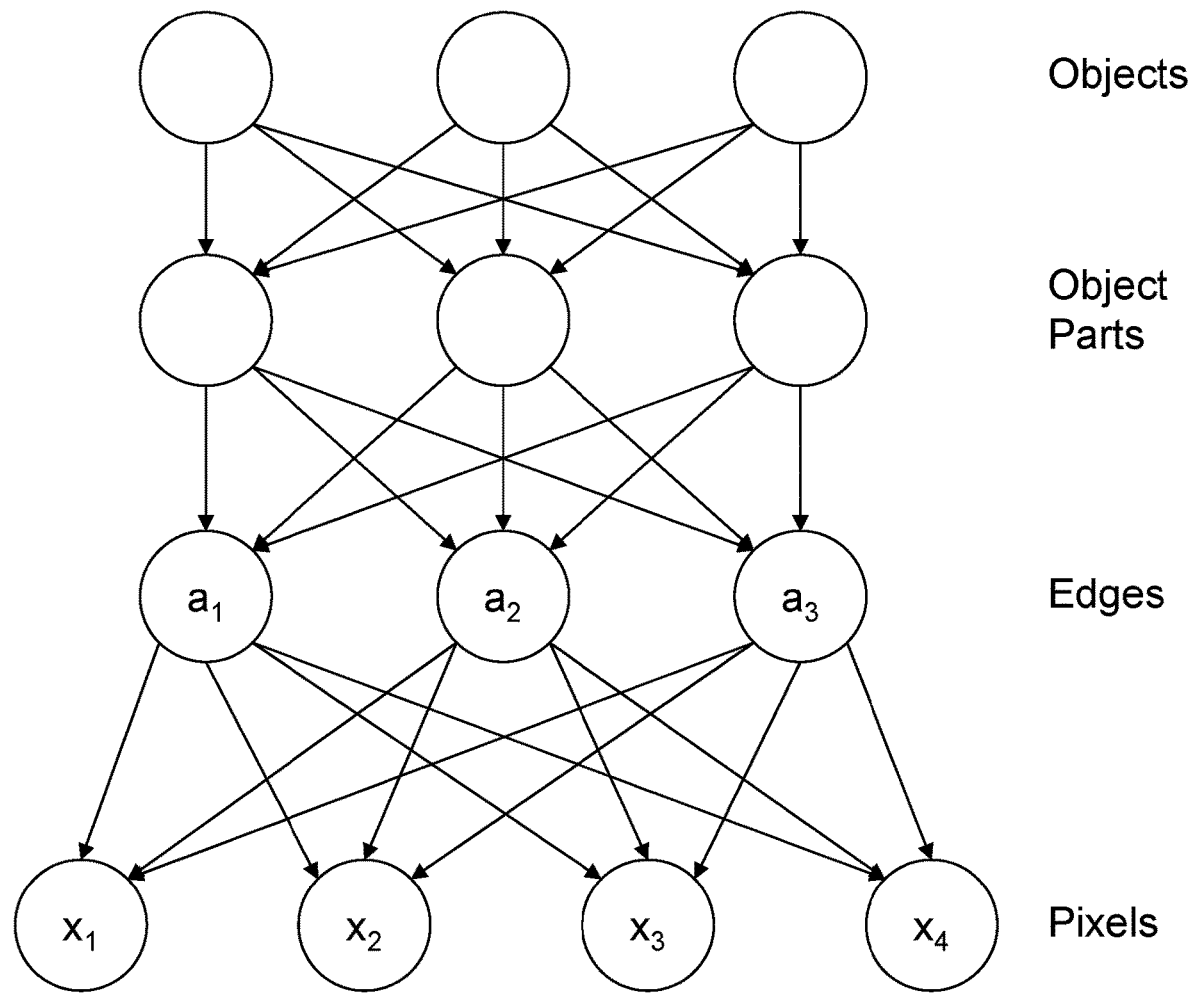
FIG. 1 is a diagram illustrating one embodiment of a deep-learning architecture according to the present disclosure.

As shown in FIG. 1, each node in a convolutional layer of the hierarchical probabilistic graph takes a linear combination of the inputs from nodes in the previous layer, and then applies 112 a nonlinearity to generate an output and pass it to nodes in the next layer. To emulate the mechanism of the visual cortex, convolutional neural networks first convolve 109 the input image with a small filter to generate feature maps (each pixel on the feature map is a neuron corresponds to a receptive field). Each map unit of a feature map is generated using the same filter. In some embodiments, multiple filters may be used and a corresponding number of feature maps will result. A subsampling layer computes 115 the max or average over small windows in the previous layer to reduce the size of the feature map, and to obtain a small amount of shift invariance. The alternate between convolution and subsampling can be repeated multiple times. The final layer is fully connected traditional neural network. From bottom to top, the input pixel value was abstracted to local edge pattern to object part to final object concept.

Figure 5A:
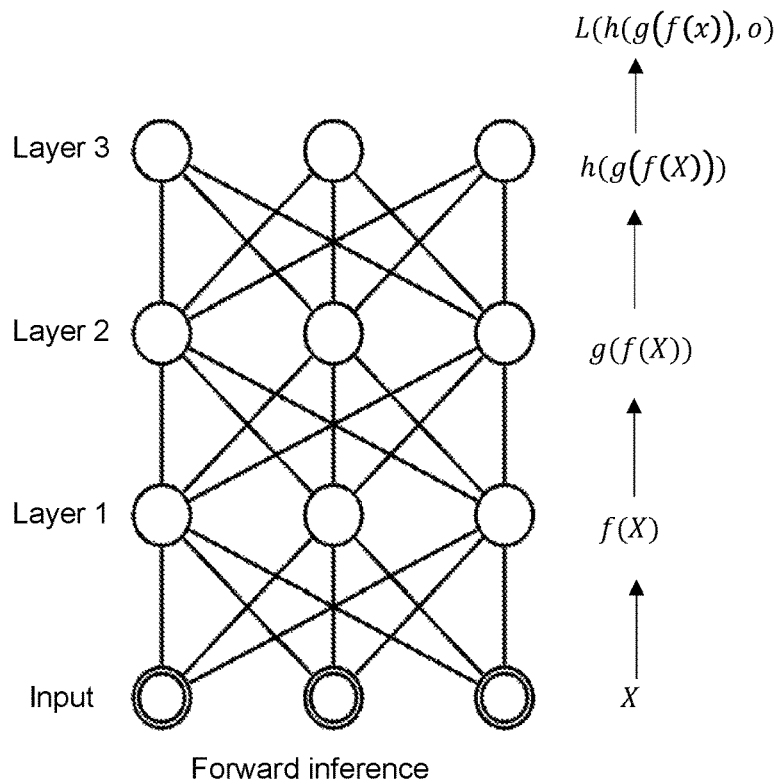
FIG. 5A is a diagram illustrating a forward inference portion of learning in a deep neural network in accordance with the present disclosure.
Figure 5B:
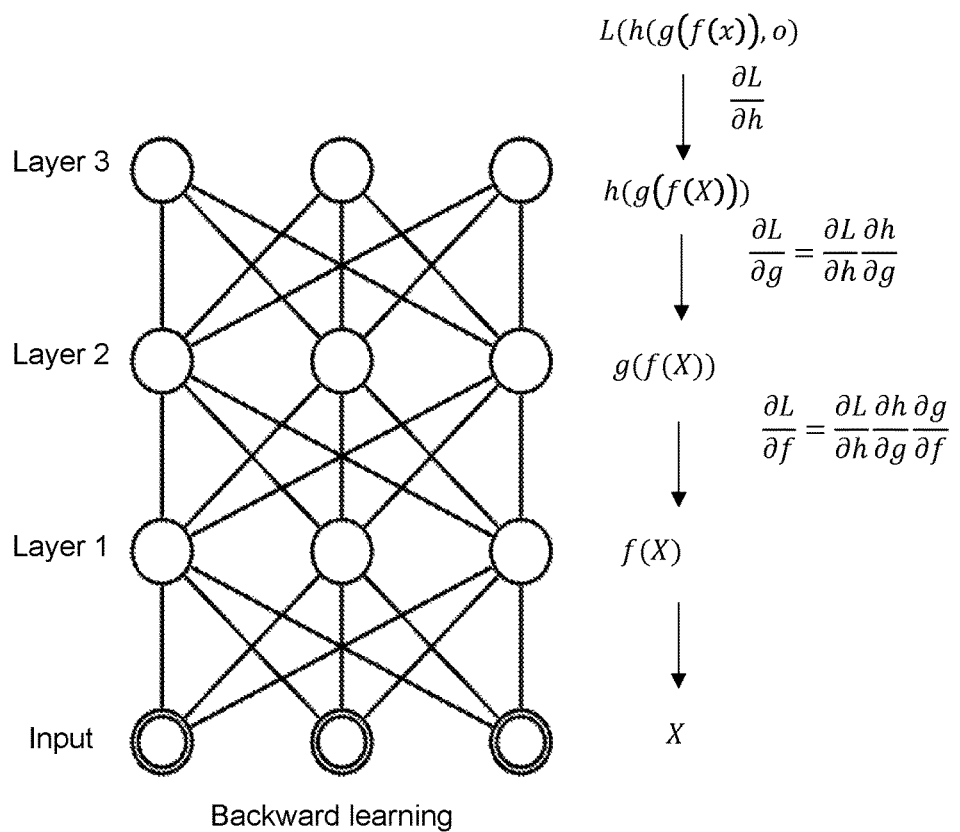
FIG. 5B is a diagram illustrating a backward learning portion of learning in the embodiment of FIG. 5A.

FIGS. 5A and 5B are simplified illustrations of how a neural network with deep structure learns from data. Each learning epoch includes forward inference (FIG. 5A) and backward learning (FIG. 5B). Given the input data and weights that connect input layer and nodes on layer 1, the node values of layer 1 can be calculated. The weights that link layer 1 to layer 2 are used to calculate node values of layer 2, then layer 3, and so on until a predicted outcome $h(g(f(X)))$ is generated. This completes the process of forward inference. During backward learning, the loss is first computed by comparing the predicted value and actual observation $L(h(g(f(x)), o))$. Then gradients are calculated to update all weight to reduce the learning loss. Thanks to the chain rule, it is sufficient to calculate the gradients of a node with respect to the previous level. Therefore, the entire gradient descent process can be conducted in a top down manner. Advanced optimization techniques such as Mini-batch, early stop, regularization on extreme weights, and adaptive learning rate can be used to help find a stable and quasi-global optimal solution.

As stated above, although a convolutional neural network is used herein to illustrate the architecture of an exemplary deep learning system, the present disclosure is not limited to a CNN. Other variants of deep architectures may be used in embodiments; for example, Auto-Encoders, DBNs, and RBMs, can be used to discover useful features from unlabeled images. Systems and methods of the present disclosure do not require reference images to classify defects. Once a wafer defect inspection system locates the defect, the defect classification system using deep learning does not need to grab the reference image. This leads to greater throughput, for example, a 2× improvement in throughput.

Figure 2:
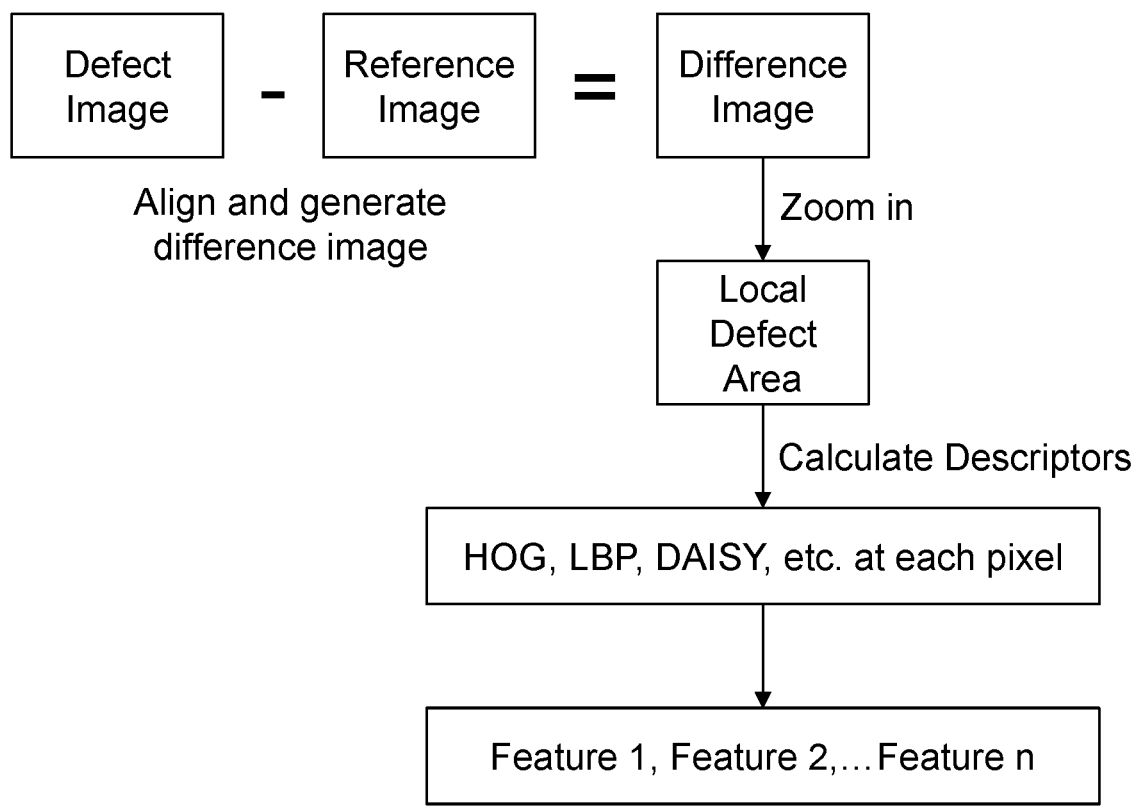
FIG. 2 is a flowchart illustrating learning features from local descriptors according to the present disclosure.
Figure 9:
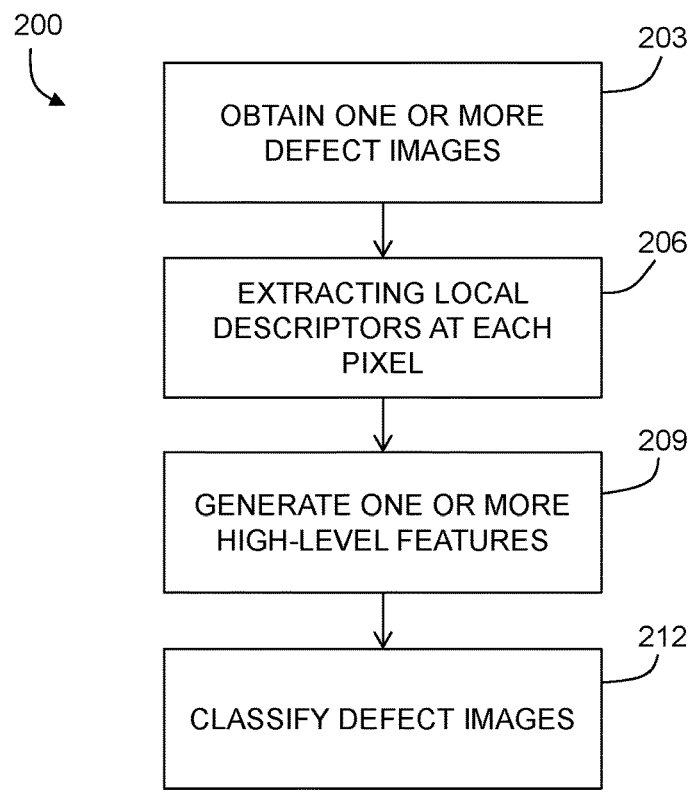
FIG. 9 depicts a method according to another embodiment of the present disclosure.

In another embodiment of the present disclosure depicted in FIG. 2, a method 200 for defect classification is provided (see also, FIG. 9). One or more defect images are obtained 203. The defect images may be images of portions of wafers wherein the defect areas are isolated. The defect areas may be determined by comparing the defect image with a reference image. The method 200 includes extracting 206 local descriptors at each pixel. A local descriptor at a pixel defines certain patterns around that pixel. Exemplary local descriptors include histograms of oriented gradients (HOG), local binary patterns (LBP), and dense descriptors such as DAISY. A machine learning algorithm is applied to find the combination of local descriptors to generate 209 a high-level feature. Principle Component Analysis (PCA) is one such machine learning algorithm suitable for this task because it maximizes the feature dissimilarities in the linearly rotated feature space. The generated 209 features then are used to classify 212 defect images into right categories.

In an embodiment of the present disclosure, features learned from local descriptors using method 200 may be injected into the deep learning method 100 to accelerate the learning process and/or supplement the number of defect images used in the learning process. Similarly, high-level features identified manually (e.g., by a domain expert) can be injected into the deep learning method 100. A good analogy to explain this idea is to learn a language. A baby can learn his native language naturally, gradually, slowly, and effectively. However, taught some pronunciation and grammar rules, one can learn a language faster, with less practice, albeit relatively less effectively.

Figure 6:
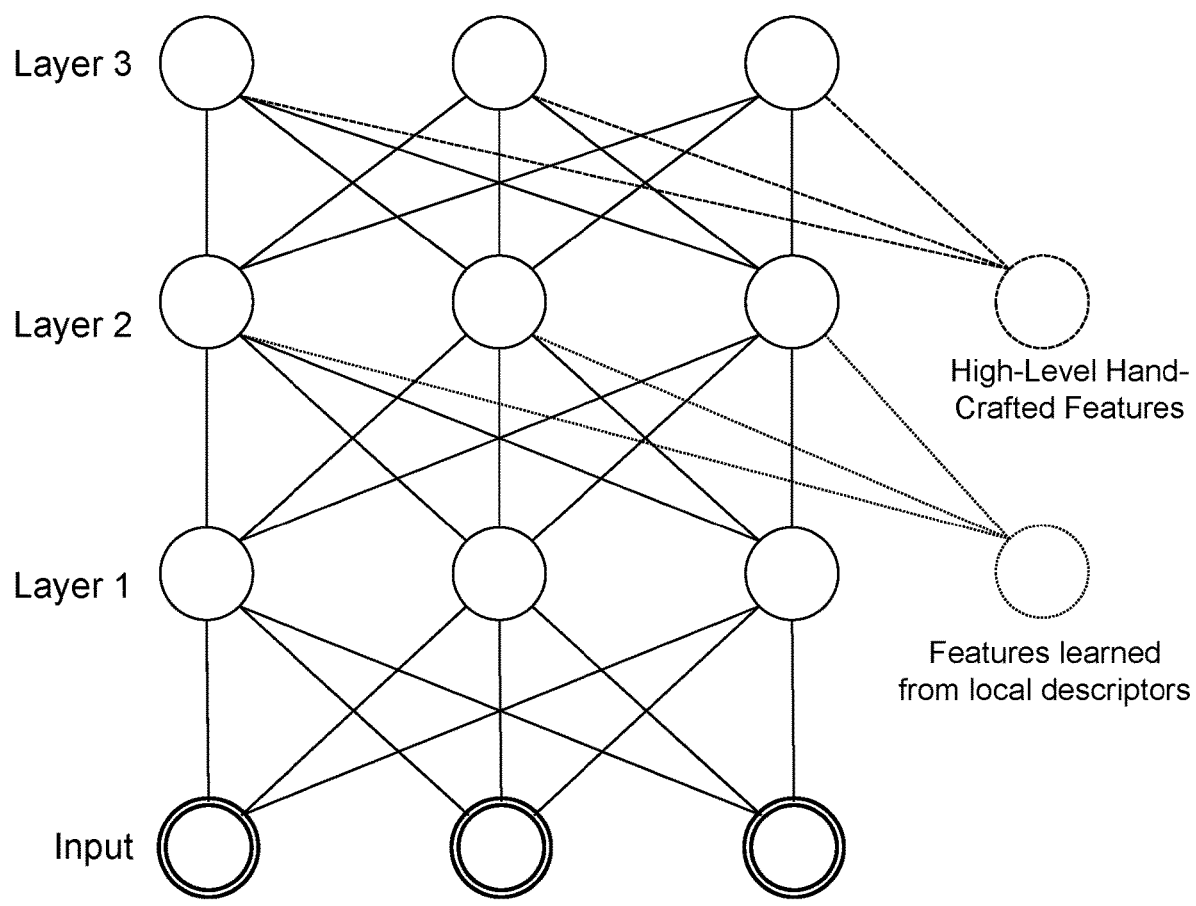
FIG. 6 is a diagram illustrating injecting additional features into a deep learning structure in accordance with the present disclosure.

In one such implementation shown in FIG. 6, selective features obtained using the approach described in method 200 above are added to the layer 1 and higher-level features obtained from domain expert are added to higher layers in the system. The "layer 1" features learned by the deep-learning method 100 are generally edge properties, which are compatible with features learned from local descriptors identified in method 200. Feature injection is very useful when the system processes a relatively new type of defect that is not well understood by the existing neural network.

Figure 7:
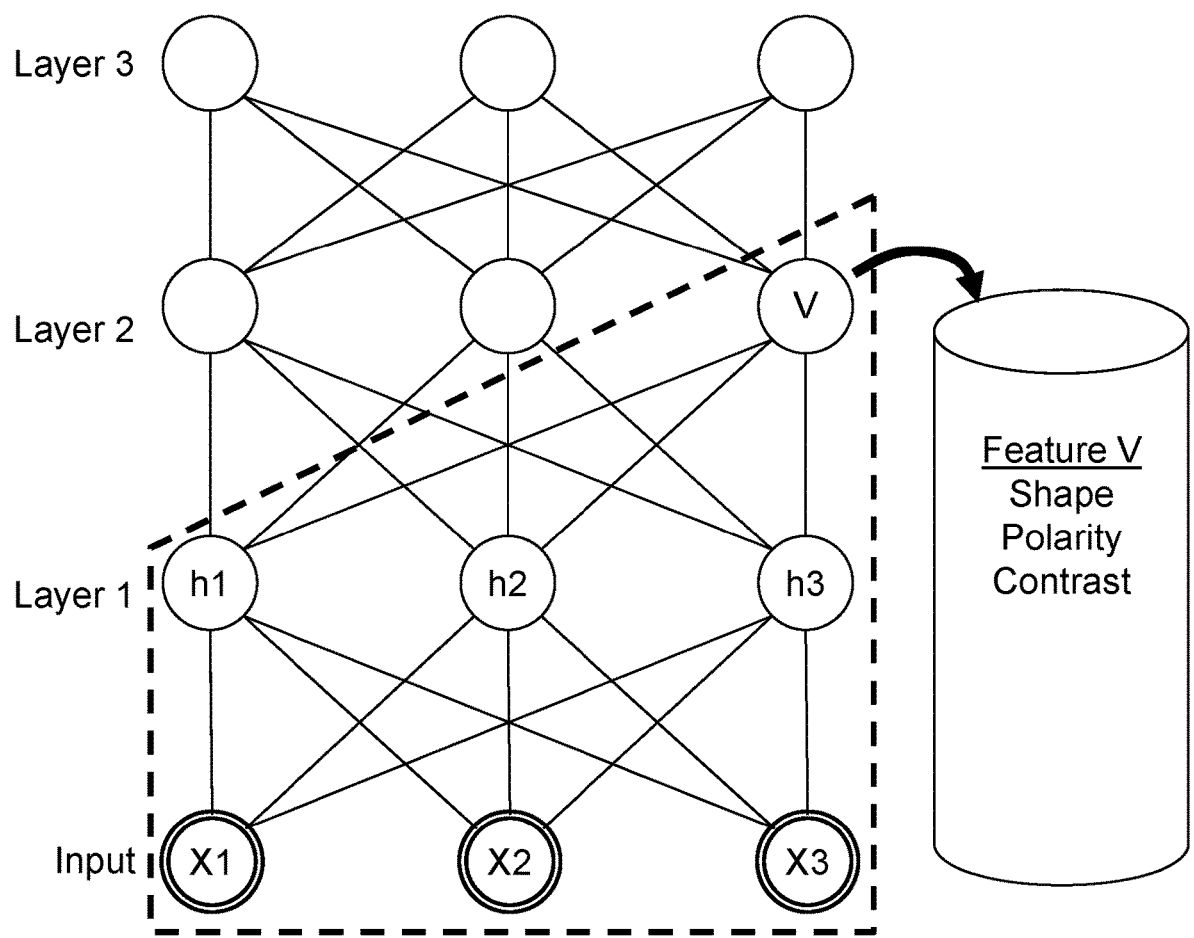
FIG. 7 is a diagram illustrating transferring machine learned features to a centralized database in accordance with the present disclosure.

Systems and methods of the present disclosure may transfer machine-learned features to an existing library of features. The library may include manually-selected features. For example, feature V, learned in layer 2 of FIG. 7, is found to have statistically significant power to classify defects. The derivation of this machine-learned feature from the inputs is examined using the function $v=f(x1, x2, x3)$. All related inputs and calculations are encapsulated to a feature and the new feature is transferred to an existing library. The new machine-learned features are extremely useful for discovering image characteristics that are difficult to represent in traditional image processing approaches. The new features extracted from the neural network may also be used for purposes other than defect classification.

Figure 10:
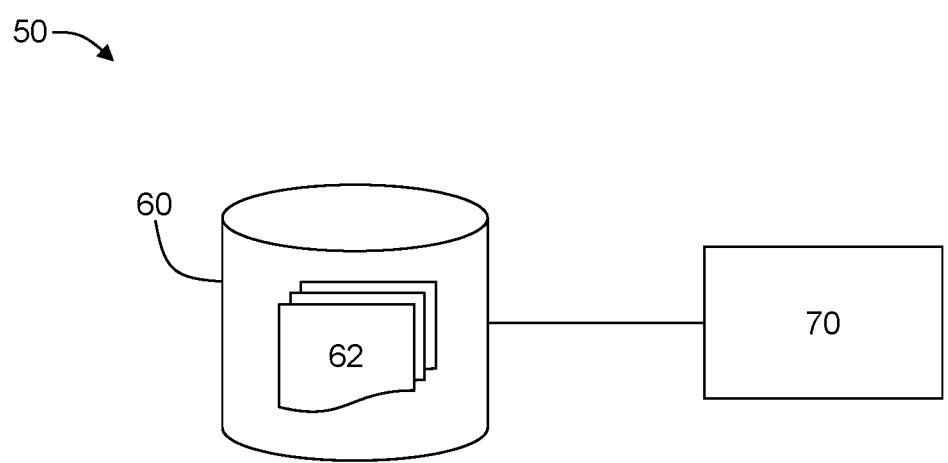
FIG. 10 is a diagram of a system according to another embodiment of the present disclosure.

In an embodiment, a system 50 for deriving features includes an electronic storage device 60 on which a feature library 62 is stored (see, e.g., FIG. 10). A deep-architecture neural network 70 is in electronic communication with the storage device 60. The neural network 70 is configured to derive a feature from one or more defect images, wherein the feature is statistically significant for classifying a defect of the defect images. The feature is encapsulated with a set of calculations used to determine the feature. The encapsulated feature is added to the feature library 62 of the storage device 60.

Figure 3A:
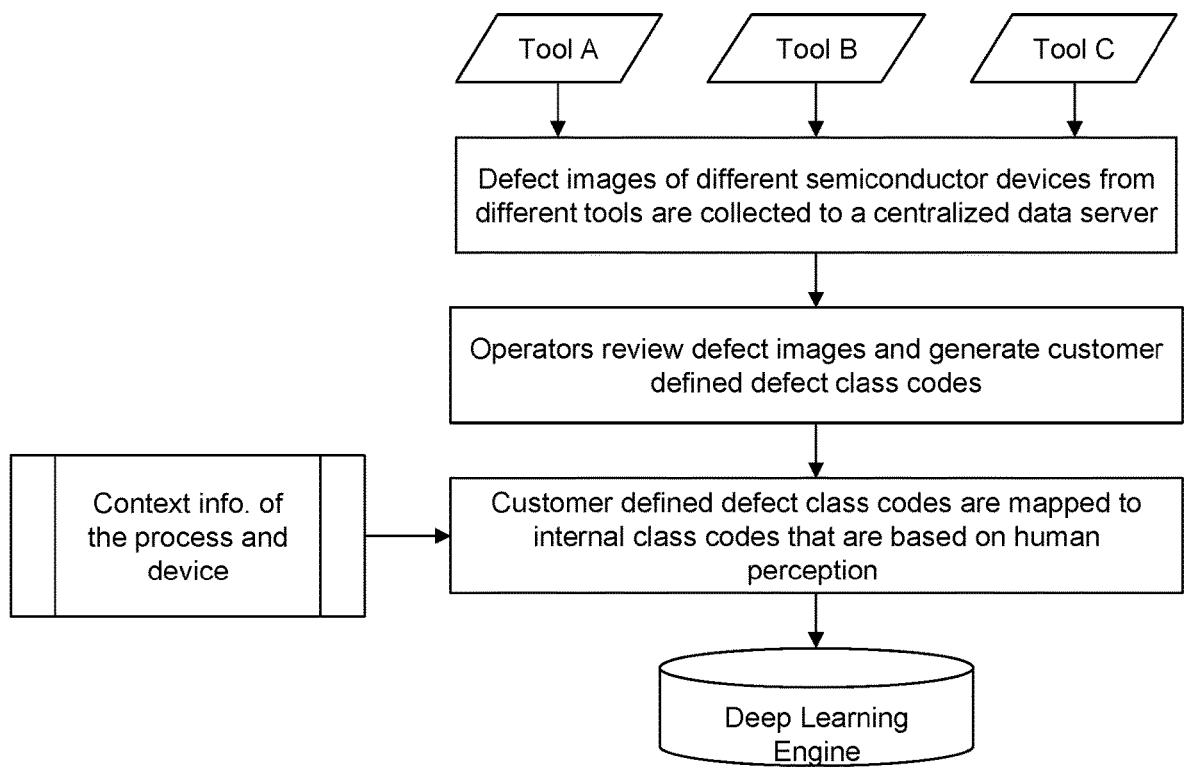
FIG. 3A is a flowchart illustrating the setup of an automatic defect classification engine according to an embodiment of the present disclosure.
Figure 3B:
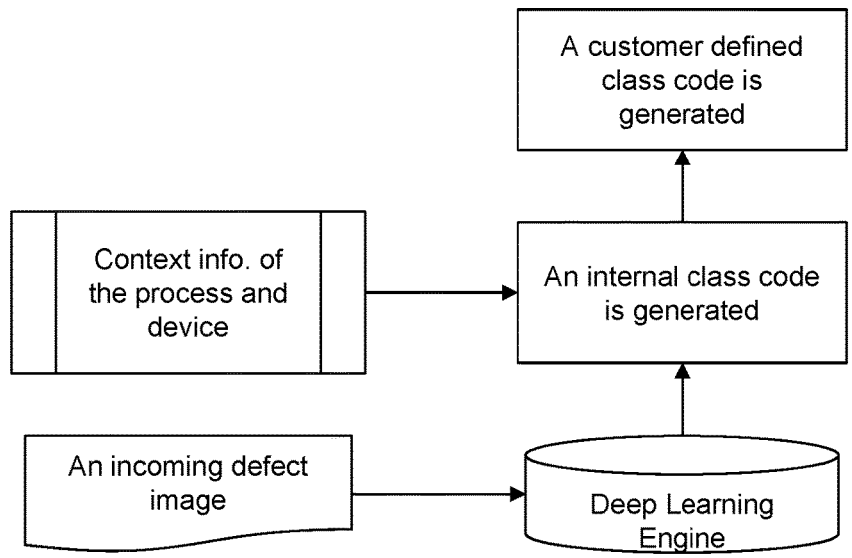
FIG. 3B is a flowchart illustrating automatically classifying a defect image according to an embodiment of the present disclosure.

In another aspect of the present disclosure depicted in FIG. 3A, a centralized system for collecting defect images from multiple tools in the deployment premises is provided. The defect images in inspection results across different semiconductor devices layer are pooled together to a centralized server. Images from different devices may be pooled together based defects similarity. This pooling reinforces the ability of the deep learning neural network to identify common patterns of defects and suppress the differences on trivial background among various types of defects. Chip manufacturers typically categorize defects based on the cause of defect, not on the defect appearance shown in inspection images. For example, two defects with a particle and some residue on each may be classified to the same category "affect from prior layer" simply because both the particle and residue come into the place as a result of imperfect process on previous layer. The system may comprise a component to map manufacturer defined class codes to a table of class codes based on human perception according to the process and device context information. The defect images with internal class codes can then be processed by the deep learning engine.

Systems and methods of the present disclosure may optimize computation speed. Building a deep learning model is extremely computationally expensive. For example, a key repetitive step in deep learning is 2-dimentional convolution—convolving an M*N feature map with an m*n filter. The complexity of the computation is O(MNmn), which is very computationally expensive. A massively parallel architecture is one technique used to solve this issue. Compared to central processing units (CPU) with relatively low numbers of processing cores, graphics processing units (GPU) typically include thousands of smaller processing cores that can be used to efficiently perform simultaneous element-wise calculations. In another approach, low-level software may be implemented to leverage other proprietary high-performance architectures. For instance, the IBM Netezza System combines hundreds of FPGA and CPUs to deliver high-performance computation. Using such high-performance architectures, the deep learning neural network can be configured to run repetitive basic matrix operations on GPUs and run more complex task and IO operations on CPUs.

Systems and methods of the present disclosure may create image jitter. One method to improve the classification accuracy in deep learning algorithm is image jitter, i.e., intentionally to replace some pixel with a random pixel from its close neighborhood. Graph models with multiple layers are complex and tend to overfit the data and sensitive to a small change on the data. Image jitter makes the deep learning algorithm more robust and stable. For example, for each defect, a testing tool may retain multiple defect images shot by E-beam from different perspectives. All defect images for the same defect are passed into deep learning algorithm to naturally create image jitter.

Although the present disclosure has been described with respect to one or more particular embodiments, it will be understood that other embodiments of the present disclosure may be made without departing from the spirit and scope of the present disclosure. Hence, the present disclosure is deemed limited only by the appended claims and the reasonable interpretation thereof.

What is claimed is:

1. A system for defect classification in a semiconductor process, comprising:
    a communication line configured to receive a defect image of a wafer from the semiconductor process;
    a deep architecture neural network in electronic communication with the communication line, comprising:
        a first convolution layer of neurons, each neuron configured to convolve a corresponding receptive field of pixels from the defect image with a filter to generate a first feature map;
        a first subsampling layer configured to reduce the size and variation of the first feature map; and
        a classifier for determining a defect classification based on the feature map; and
    wherein the system is configured to inject one or more features learned from local descriptors at one or more higher convolution layers of the deep architecture network, wherein the features learned from local descriptors are determined by:
        extracting a plurality of local descriptors at each pixel of each of a plurality of defect images, wherein each of the local descriptors is a defect classifier of the defect images, and wherein each of the local descriptors is external to the deep architecture neural network; and
        generating the one or more features learned from local descriptors based on the extracted local descriptors.

2. The system of claim 1, wherein the system is configured to replace a pixel in the defect image with a random pixel from a neighboring region.

3. A method for defect classification in a semiconductor process, comprising:
    extracting, using a deep-architecture neural network, one or more features from a defect image from the semiconductor process;
    injecting one or more features learned from local descriptors at one or more higher layers of the deep-architecture neural network, wherein the features learned from local descriptors are determined by:
        extracting, using a processor, a plurality of local descriptors at each pixel of each of a plurality of defect images, wherein each of the local descriptors is a defect classifier of the defect images, and wherein each of the local descriptors is external to the deep architecture neural network; and
        generating, using the processor, the one or more features learned from local descriptors based on the extracted local descriptors; and
    classifying, using the deep-architecture neural network, the defect image based on the extracted one or more features.

4. The method of claim 3, wherein the one or more features are extracted from the defect image using a convolutional neural network (CNN) having one or more convolutional layers, each convolutional layer of the one or more convolutional layers followed by a subsampling layer.

5. The method of claim 4, wherein extracting one or more features further comprises convolving, at a first convolutional layer of the CNN, each of a plurality of overlapping receptive fields with a filter to generate a first feature map having a plurality of map units, wherein each receptive field comprises a subset of pixels of the defect image.

6. The method of claim 5, wherein extracting one or more features further comprises applying a nonlinearity to the map units of the first feature map.

7. The method of claim 5, wherein extracting one or more features further comprises combining, at a first subsampling layer of the CNN, two or more map units of the first feature map into a unit of a subsampling feature map.

8. The method of claim 7, wherein a size of a unit of the first feature map is reduced by averaging the values of the map units, finding the maximum value of the map units, or adding the map units.

9. The method of claim 8, wherein at each subsequent convolutional layer of the CNN, a subset of map units of the feature map of the preceding layer are convolved with a filter to create a corresponding feature map.

10. The method of claim 9, wherein the defect image is classified using a fully-connected layer of the CNN.

11. The method of claim 4, comprising training the CNN using back propagation to refine the filters of each convolution layer of the CNN.

12. The method of claim 3, wherein the plurality of local descriptors include one or more of a histogram of gradients (HOG), a local binary pattern, and a DAISY descriptor.

13. The method of claim 12, wherein the one or more high-level features are generated by principle component analysis (PCA).

14. The method of claim 3, wherein the defect image is processed using an auto-encoder, a Deep Belief Network (DBN), or a Restricted Boltzmann Machine (RBM).

15. The method of claim 3, wherein the one or more defect images are stored in a centralized data server.

16. The method of claim 15, where defect class codes are generated based on the one or more defect images.

17. The method of claim 16, wherein the defect images are classified based on the defect codes.

18. The method of claim 3, further comprising replacing a pixel in the defect image with a random pixel from a neighboring region.

19. A system for deriving features, comprising:
an electronic storage device;
a feature library stored on the storage device;
a deep-architecture neural network in electronic communication with the storage device, the neural network having one or more convolutional layers, each convolutional layer of the one or more convolutional layers followed by a subsampling layer, the neural network configured to:
derive a feature from one or more defect images of a semiconductor wafer, wherein the feature is for classifying a defect of the defect images;
encapsulate the feature with a set of calculations used to determine the feature; add the encapsulated feature to the feature library of the storage device; and
inject one or more features learned from local descriptors at the one or more higher convolution layers, wherein the features learned from local descriptors are determined by:
extracting a plurality of local descriptors at each pixel of each of a plurality of defect images, wherein each of the local descriptors is a defect classifier of the defect images, and wherein each of the local descriptors is external to the deep architecture neural network; and
generating the one or more features learned from local descriptors based on the extracted local descriptors.

20. The system of claim 19, wherein the neural network is further configured to replace a pixel in one or more of the defect images with a random pixel from a neighboring region.

* * * * *